United States Patent [19]

Hamada et al.

[11] Patent Number: 4,517,644
[45] Date of Patent: May 14, 1985

[54] SYMMETRY TYPE LOOP COMMUNICATION SYSTEM

[75] Inventors: Nobuhiro Hamada, Hitachiota; Norihiko Sugimoto, Katsuta; Masumi Nawa, Hitachi, all of Japan

[73] Assignees: Hitachi, Ltd.; Hitachi Engineering Co., Ltd., both of Tokyo, Japan

[21] Appl. No.: 295,547

[22] Filed: Aug. 24, 1981

[30] Foreign Application Priority Data

Sep. 3, 1980 [JP] Japan .................. 55-121041

[51] Int. Cl.³ .................. G06F 15/16; H04J 3/08
[52] U.S. Cl. .................. 364/200; 370/86; 340/825.05
[58] Field of Search ............... 370/16, 17, 86; 371/22, 371/68, 58; 455/67; 364/200 MS File, 900 MS File; 340/825.05

[56] References Cited

U.S. PATENT DOCUMENTS

| | | | |
|---|---|---|---|
| 3,633,166 | 1/1972 | Picard | 340/825.05 |
| 3,681,759 | 8/1972 | Hill | 370/86 |
| 3,781,815 | 12/1973 | Boudreau et al. | 370/86 |
| 3,919,484 | 11/1975 | Maxemchuk | 370/86 |
| 4,004,275 | 1/1977 | Arndt et al. | 370/86 |
| 4,028,667 | 6/1977 | Breslau et al. | 364/200 |
| 4,048,446 | 9/1977 | Hafner et al. | 370/86 |
| 4,136,384 | 1/1979 | Okada et al. | 364/200 |
| 4,159,470 | 6/1979 | Strojny et al. | 340/825.05 |
| 4,227,178 | 10/1980 | Gergaud et al. | 370/86 |
| 4,288,871 | 9/1981 | Baugh | 370/86 |
| 4,304,001 | 12/1981 | Cope | 371/8 |
| 4,306,304 | 12/1981 | Baxter et al. | 370/86 |
| 4,354,229 | 10/1982 | Davis et al. | 364/200 |
| 4,383,315 | 5/1983 | Torng | 340/825.05 |
| 4,387,425 | 6/1983 | El-Gohary | 364/200 |
| 4,395,710 | 7/1983 | Einolf, Jr. et al. | 340/825.5 X |

OTHER PUBLICATIONS

'System Design of the Distributed Double-Loop Computer Network (DDLCN)' by Liu et al.; Dept. of Comp. and Info. Science, Ohio State University; 1979, IEEE.

Primary Examiner—Raulfe B. Zache
Assistant Examiner—William G. Niessen
Attorney, Agent, or Firm—Antonelli, Terry & Wands

[57] ABSTRACT

A symmetric type loop communication system having no master station, in which a plurality of control stations connected to a loop communication path each have a timer with its set time different from each other control station. The timer of a station is reset when a transmission right signal (GA signal) from another control station is received. On the other hand, a GA signal is sent out to another control station together with a message frame when the timer thereof has counted to a predetermined state.

12 Claims, 8 Drawing Figures (A) CLOCK PULSE
(B) INPUT SIGNAL
(C) OUTPUT SIGNAL

SYMMETRY TYPE LOOP COMMUNICATION SYSTEM

BACKGROUND OF THE INVENTION

This invention relates to a communication system in which an arbitrary number of control stations (hereinafter referred to simply as modules) are connected to a serial transmission path which is a single loop communication path.

A prior art communication system, in which a plurality of control stations are connected to a loop, has been provided with both a master station and slave stations. An example is seen in U.S. Pat. No. 4,136,384 and in the article "system design of the distributed double-loop computer network (DDLCN)" by Ming T. Liu et al, Dept. of Computer and Information Science, The Ohio State University, Columbus, Ohio 43210, 1979, IEEE. This prior art loop communication system with a master station and slave stations has a construction such as shown in FIGS. 1 and 2. That is, process input-output stations 3 are connected to a loop communication path, which is provided in the form of a serial bus 1, through communication control stations 2. Operators 3A and sensors 3B, etc. are connected to the stations 3. A control or master station 4 is connected to the serial bus 1. The above-mentioned process input-output stations 3 are slave stations of the control station 4. The communication controlling stations 2 to which the control station 4 and the process input-output stations 3 are connected has a construction such as shown in FIG. 2. That is, in the control station 4, a repeater or a wave form shaping circuit 5 and a stand-by control station (back-up station) 19 are selectively connected to the loop communication path 1 through a switch S1. The loop communication path 1 is connected to the output terminals of the repeater 5 and the stand-by control station 19 through another switch S2. The input and output switches S1 and S2, respectively, are usually connected to the repeater 5. The control station 4 is so constructed that a signal entering the input of the repeater 5 is introduced into both a 8-bit buffer 6 and a GA detection circuit 9 which detects a GA (go ahead) signal or a signal having a transmission right. A timer 10 is connected to the GA detection circuit 9. An abnormal state detecting circuit 11 and a GA generation circuit 7 are connected to the timer 10. It is so constructed that an oscillation signal from a clock oscillator 8 is supplied to the GA generation circuit 7, the output terminal of which is connected to the output of the repeater 5 through a switch. This switch has such a structure that switching to the 8-bit buffer 6 can also be effected. The switching is effected by an output signal from the timer 10. The switches on the input and output sides of the repeater 5 make a connection with the stand-by control station 19 when the abnormal state detecting circuit 11 operates. The repeater 5, the 8-bit buffer 6, the GA generation circuit 7, the oscillator 8, the GA detection circuit 9, the timer 10, the abnormal state detecting circuit 11 and the stand-by control station 19 constitute the control station 4.

Furthermore, the input of a repeater 5 in the communication controlling station 2 is connected to the loop communication path 1 through a switch, while the output of this repeater 5 is connected to the loop communication path 1 through a switch. A communication controlling LSI 12 and a clock synchronization circuit 13 are connected to the repeater 5. The station 2 is so constructed that a signal from the clock synchronization circuit 13 enters the communication controlling LSI 12, which is connected to a microprocessor unit MPU 14 by means of a data bus. A ROM 15, a RAM 16 and input-output interface LSI's 17A and 17B are connected to the MPU 14 through respective buses. A process input-output station 3 is connected to the input-output interface LSI 17A through a bus line. Further, an address setting switch 18 is connected to the input-output interface LSI 17B through a bus line. The communication controlling LSI 12, the clock synchronization circuit 13, the MPU 14, the ROM 15, the RAM 16, the input-output interface LSI 17, the address setting switch 18 and the repeater 5 constitute the communication controlling station 2. The controlling station 4 constructed in this manner monitors whether the GA signal passes in a pattern with an interval or is interrupted by some cause such as noise. Usually, a signal which is introduced into the repeater 5 from the loop communication path 1 through the switch is amplified by the repeater 5 and applied to the 8-bit buffer 6 and the GA detecting circuit 9. The GA signal amplified by the repeater 5 is detected by the GA detecting circuit 9, which resets the timer 10. The reset means that, if the GA signal is detected, the timer is cleared to "zero". If the count value becomes abnormally large, the abnormal state detecting circuit 11 detects this.

In the communication controlling station 2, a signal transferring from the serial bus or the loop communication path 1 is amplified by the repeater 5 and introduced into the communication controlling LSI 12 and the clock synchronization circuit 13.

As described above, the communication control in the conventional communication system has been performed as a master-slave type. That is, in such a system, the control station 4 which is a master station (primary station) controls the GA signal as well as the loop communication path 1, or the transmission path, simultaneously. Therefore, (1) Since the communication system is of a master-slave type, the control station which is a master station (primary station) becomes a bottle neck against an increase of reliability. Namely, if trouble occurs in the master station, the whole communication to slave stations becomes impossible.

(2) Since the control station, or the master station 4, is provided without regard to the number of modules 2 which are provided, two kinds of modules for the master and slave stations, as shown in FIG. 2, are necessary. This has been a cause for preventing standardization (unification) of modules.

SUMMARY OF THE INVENTION

The object of this invention is to provide a symmetry type loop communication system having a loop communication path without using any master station and which is capable of communication with high reliability and a high speed of response.

According to this invention, control stations (modules) with the same construction are connected to a loop communication path, each module being identified by a logic number which forms an address assigned thereto. The address of a partner module is specified in a message frame with a selected message along with a signal of transmission right (GA signal) and a 2-byte CRC (Cyclic Redundancy Check) code while, as a transmission code, the conventional NRZI (Non Return to Zero and Inverting at zero) is adopted. All the modules have a monitor timer for the GA signal. The monitor timer of each module is reset, or returned to an initial valve state, when the GA signal is detected, whereby a secure communication with a high speed response is attained by a loop communication path without using a master station.

Conditions which should be satisfied for realizing such a symmetry type system are (1) The GA signal should be sent out when a module finds it necessary. For this purpose, on the input side of the communication path, an auxiliary input forming circuit necessary for sending out the GA signal is provided.

(2) It is necessary that each module, just after it sends out a GA signal, passes a message frame for a third module which is sent out by another module that has received the GA signal. For this purpose, even in the case of a system with a minimum construction having only three modules, a delay time with a total of 8-bits time (flag pass time) is necessary.

(3) Communication control is carried out independently of the number of modules on the communication path. Therefore, even with a large number of modules, superfluous delay circuits will be selectively bypassed in order that the time lag of the transmission response may not be unnecessarily large.

(4) In order that more than one module does not generate a GA signal concurrently, a transmission check of the GA signal is effected with each module. After the disappearance of the signal is confirmed by the GA absence of a GA signal for a continuous time determined relatively by a timeout period which is different for each module, the GA signal is sent out.

(5) Existence of more than two GA signals on the communication path in the worst case is checked and the number of GA signals on the communication path is reduced.

DESCRIPTION OF THE PREFERRED EMBODIMENTS

Embodiments of this invention will be explained hereinafter.

Figure 1:
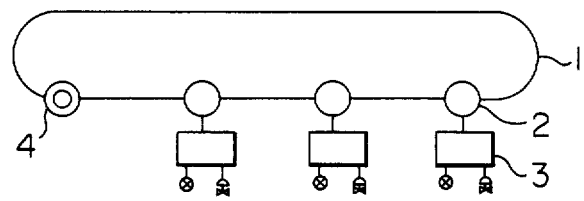
FIG. 1 is a schematic diagram showing a prior art master-slave type communication system using a master station and slave stations.
Figure 2:
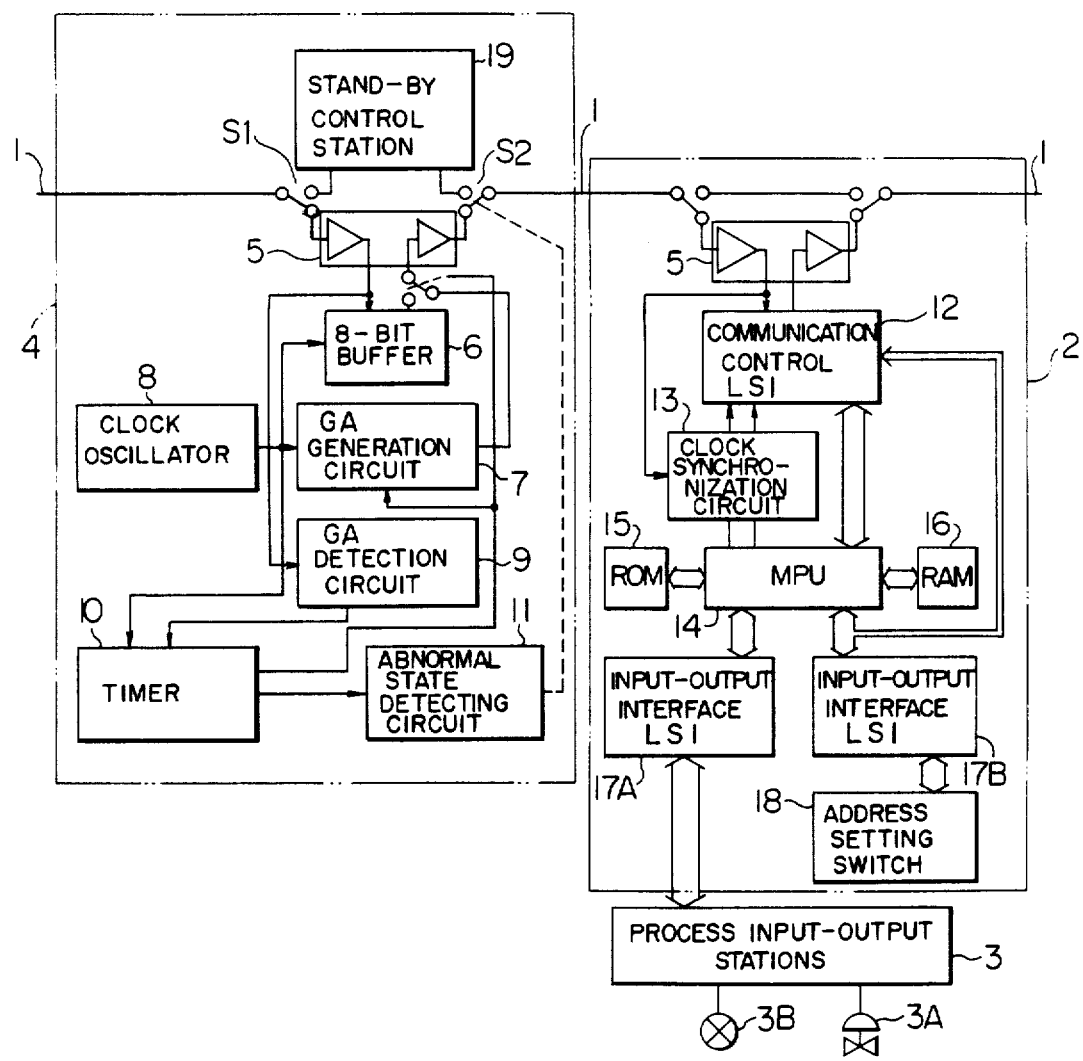
FIG. 2 is a block circuit diagram showing details of a communication controlling station and a process input-output station as shown in FIG. 1.
Figure 3:
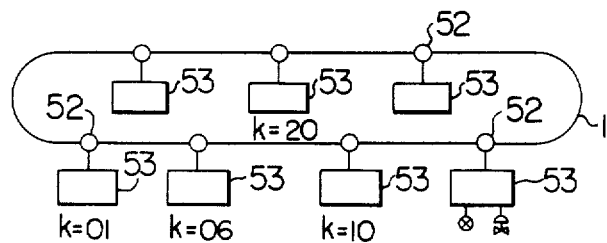
FIG. 3 is a system diagram showing an embodiment of a symmetry type loop communication system according to this invention.

In FIG. 3, an embodiment of a symmetric type loop communication system according to this invention is shown.

Figure 4:
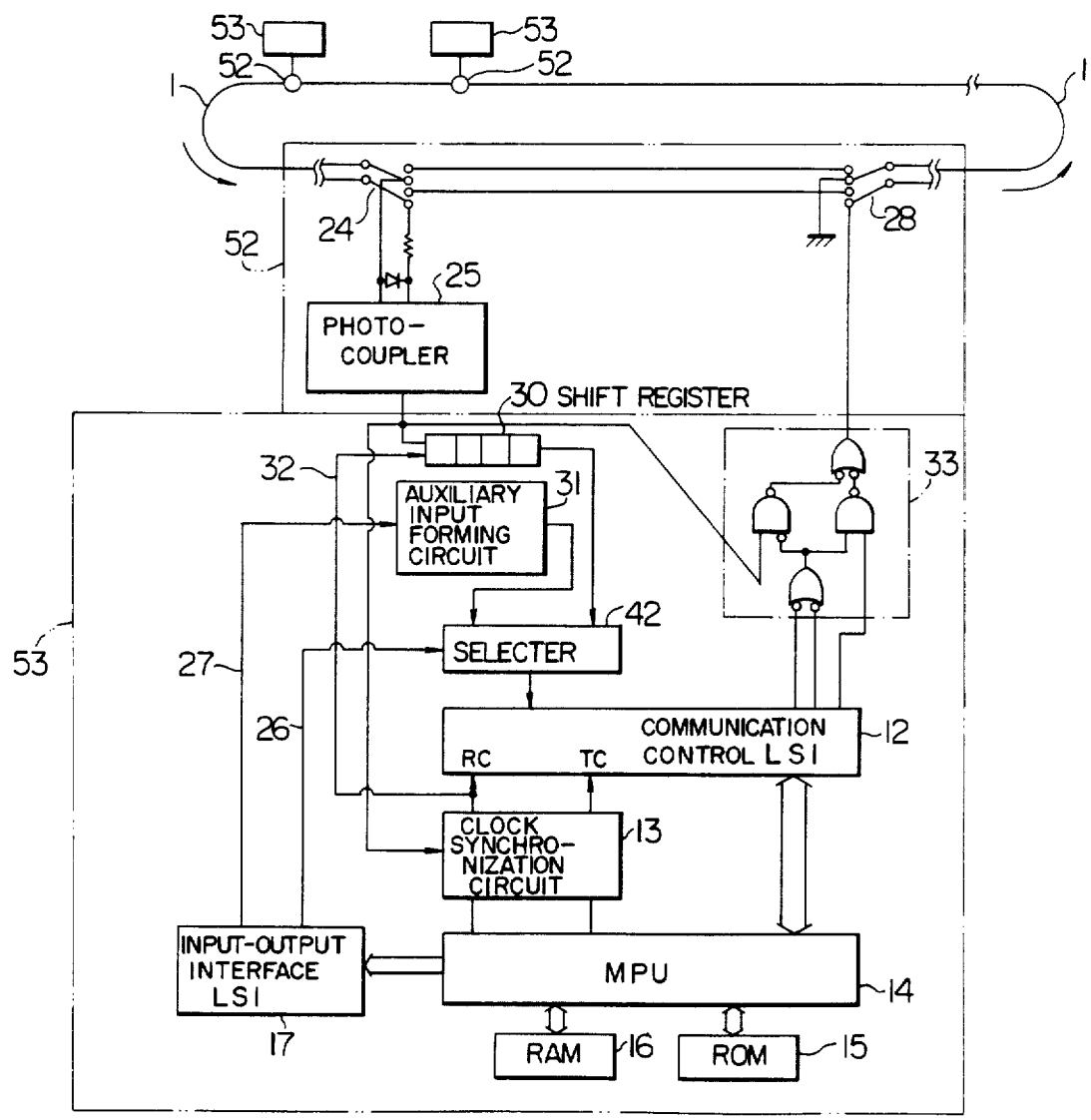
FIG. 4 is a block diagram showing details of a connection part of the communication path and the controlling station as shown in FIG. 3.

It is seen that a plurality of coupling parts 52 are provided on a loop communication path 1, and control stations 53 are provided at these coupling parts. In the figure, the values of k as shown under control stations 53 are logic numbers indicating the respective control station. Detailed circuit diagrams of the coupling parts 52 to the communication path and the control station 53 are shown in FIG. 4. That is, a bypass relay 24 is connected to the loop communication path 1, and a photocoupler 25 is connected to the bypass relay 24. A 4-bit shift register 30, an output side gate group 33, and a clock synchronization circuit 13 are connected to the output terminal of the photocoupler 25. A communication control LSI 12 is connected to this 4-bit shift register 30 and to an auxiliary input forming circuit (a GA signal generating circuit) 31 through selector 42. It is so constructed that a signal from the clock synchronization circuit 13 is introduced into the communication control LSI 12, which is connected to an MPU 14 by a bus line. A ROM 15, a RAM 16 and an input-output interface LSI 17 are connected to the MPU 14 by bus lines. Further, a control signal 27 for the auxiliary input forming circuit 31 is sent out from the input-output interface LSI 17. It is so constructed that the 4-bit shift register 30 is driven by an output signal from the clock synchronization circuit 13. The output side gate group 33 is connected to the output terminal of the communication control LSI 12. A bypass relay 28 is connected to the output terminal of the output side gate group 33. The connection part 52 between a station and the communication path is constituted by the bypass relays 24 and 28, and the photo-coupler 25. The communication control LSI 12, the clock synchronization circuit 13, the MPU 14, the ROM 15, the RAM 16, the input-output interface LSI 17, the 4-bit shift register 30, the auxiliary input forming circuit 31 and the output side gate group 33 constitute the control station 53.

Next, explanation will be made of the operation of the communication system constructed in this manner. A signal transmitted from the loop communication path 1 is selected by the bypass relay either to bypass the module 53 (in time of module trouble) or to enter the module 53 (in time of normal state). A signal which has entered the module 53 is introduced into the clock synchronization circuit (synchronization signal generating circuit) 13 through the photo-coupler 25 for insulation, and, at the same time, is applied to the selector 42 through the bit delay circuit section, formed by the 4-bit shift register 30. The communication LSI 12 is controlled by the microprocessor MPU 14. An output from the communication LSI 12 is coupled to the loop communication path 1 through the output side gate group 33 and the bypass relay 28.

The 4-bit register 30 is controlled to be conductive, when the module concerned 53 becomes a GA signal transmitting station. Unless the transmission of the GA signal is delayed by a suitable time with use of the shift register 30, it may happen that a signal sent out from the present station is superimposed on another signal which has been sent out by another module prior to the above signal and is circling round the loop communication path 1, which causes an undesirable contention situation. When the GA signal transmitting right is transferred to another module, the above shift register is turned off. The auxiliary input forming circuit 31 exists in order to form an auxiliary input necessary for sending out a GA signal when the module concerned becomes a GA signal transmitting station and at the same time the communication control LSI 12 is in an on-loop state. The auxiliary input is obtained by forming the GA signal at the present station. For example, parallel data obtained by the sensor 3B is converted into serial data by the communication control LSI 12, as is well known, and carried on the communication path as a message frame.

Figure 5:
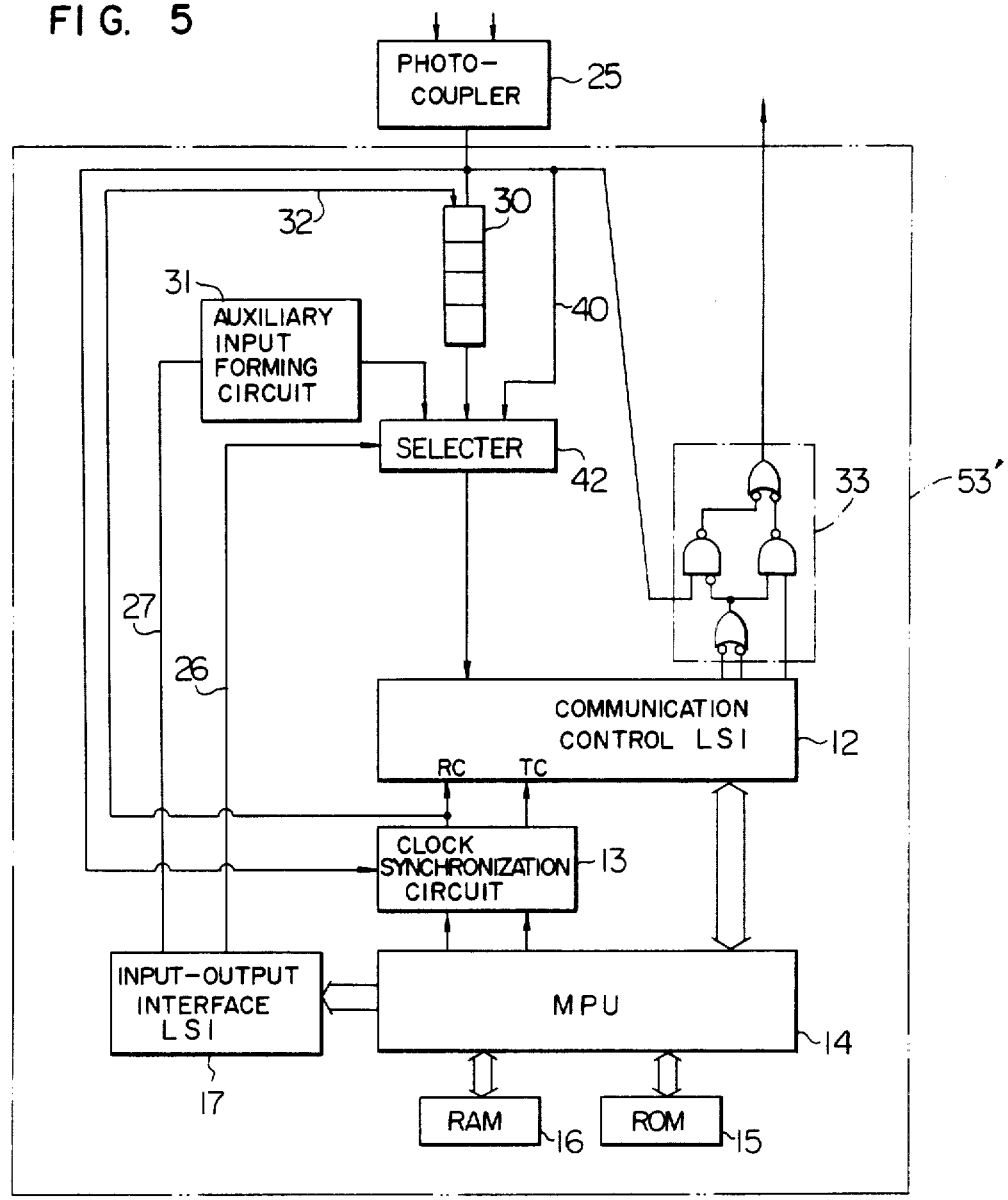
FIG. 5 is a partial block diagram showing another embodiment of the system according to this invention.

In FIG. 5, another embodiment of the symmetric type loop communication system is shown. A difference from the control station 53 shown in FIG. 4 is that a bypass circuit 40 is provided. In the present embodiment, in order to avoid a response lag due to many serially connected delay circuits, a control circuit (selection circuit) 42 for bypassing those delay circuits, or those shift registers, of such modules having no transmission right is provided. In FIG. 5, like reference numerals are used to denote like parts with like functions as in the embodiment of FIG. 4.

An input to the bit delay part, or the shift register 30, consists of a received signal from the communication path and a clock signal for driving the shift register 30. Furthermore, an input to the selection circuit 42 is a signal 26 from the input-output interface 17 for controlling a selection whether the bypass circuit 40 is to be used or not. The delay circuit 30 shifts by e.g. 4 bits the input signal from the loop communication path in synchronization with the above-mentioned clock signal. The operation of the selection circuit 42 is specified by the above control signal 26 (1 corresponds to a delay). The signal pattern using NRZI on the communication path takes "0" in the presence of a variation in the signal level while "1" in the absence thereof.

Figure 6:
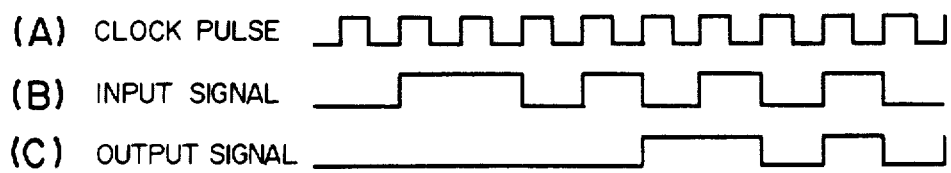
FIG. 6 is a diagram of wave forms showing the delay action of a delay circuit.

FIG. 6 shows time charts demonstrating the operation of the delay circuit shown in FIG. 5. An output signal as shown in FIG. 6(C) is lagged by 4 bit clock pulses RC as shown in FIG. 6(A) with respect to an input signal as shown in FIG. 6(B).

Next, a process in which a station which transmits a GA signal becomes a sole station on the communication path will be described.

Figure 7:
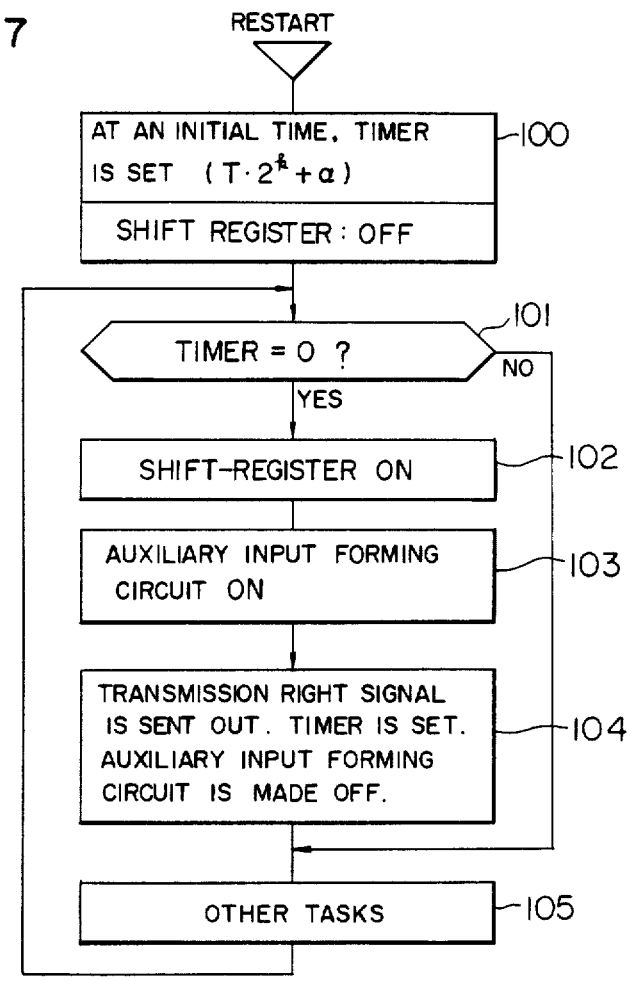
FIGS. 7 and 8 are flow charts showing the operation of the embodiment as shown in FIG. 5.
Figure 8:
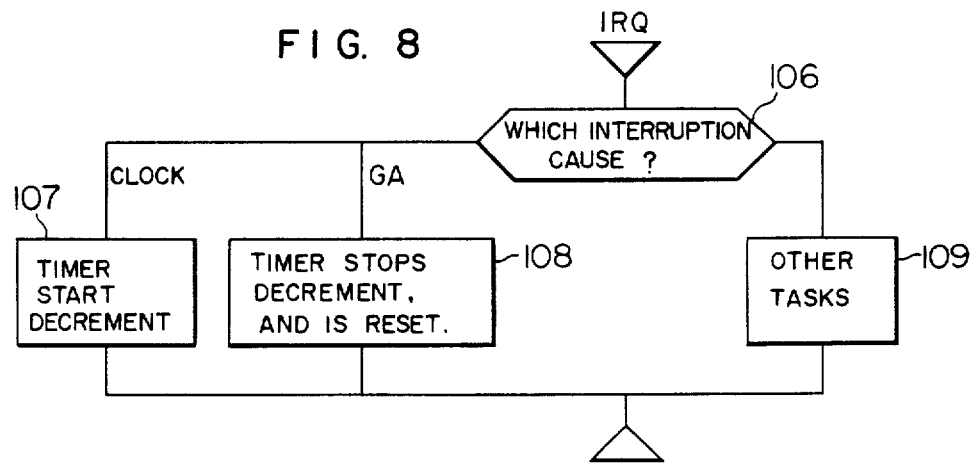

In FIGS. 7 and 8, a process flow for controlling the circuit in the embodiment as shown in FIG. 5 is demonstrated. In FIG. 7, the timer for monitoring a GA signal is set depending on a logic number k of each station at the initial time when the power supply is turned on, as shown in a step 100. At the same time, the shift register 30 is turned off. That is, since the selection circuit 42 instructs the use of the bypass circuit 40, a received signal from the communication path is introduced directly into the communication control LSI 12 (in the case of FIG. 4, due to the absence of any bypass circuit 40, there is no step for turning the shift register 30 off). The set time of the timer for monitoring the GA signal varies with each control station, and is chosen as $T \cdot 2^k + \alpha$ ($\alpha$ is a correction coefficient). The timer is a so-called soft timer formed by the MPU 14 and the RAM 16. Next, in a step 101, it is judged whether the GA monitoring times have expired or not. In the case of expiration, a time as set in the control station has elapsed. Then, the shift register is turned on in a next step 102. If the shift register is on, this means that transmission of the GA signal by the action of the timer is required. With the shift register on in the step 102, the auxiliary input forming circuit 31 is driven in a step 103. With the auxiliary input forming circuit 31 on, or with the GA signal transmitted, in the step 103, a signal GA for the transmission right of the circuit is transmitted in a step 104. At the same time, the GA monitor timer for the station concerned is set. Thus, the timer starts counting or decrements. Simultaneously, the auxiliary input forming circuit 31 is turned off. After the end of some operations in the step 104, another task, or a control program, is performed in a step 105. In this manner, the GA monitor timer is set depending on the logic number k of each station at the station initialization, at the GA signal transmission, at the interruption by the passage of the GA signal, and at the relinquishment of the GA transmission right. Decrementing of the timer occurs at a time of interruption by a clock (cf. step 107). When the timer has a value of 0, a process of GA signal transmission is performed. In this case, an on-off action of the auxiliary input forming circuit becomes necessary for the formation of an auxiliary input (steps 101 to 103). Further, the shift register is turned on when the transmission of the GA signal by the action of the timer becomes necessary, while it is turned off (bypass of the shift register) at times of initialization and change of message paths (receipt of a message frame). The on and off actions of the shift register correspond to acquisition and reliquishment of the GA signal transmission right, respectively.

Here, it should be noted that the GA signal is transmitted either when the timer of a station having the GA signal transmission right has counted out, or after a station which transmits a message frame has received a receiving frame.

As apparent from the above explanation of the operation with the aid of the flow charts, at the time of power supply, a control station that has the shortest set time obtains the transmission right for sending out a GA signal. In other control stations which receive the GA signal, each timer has not counted out yet. Hence, the counting action of the timer, which has been counting, is stopped. In this way, only one control station which has a timer with the shorter time can become a transmitting station, while the other stations become receiving stations. The order with which a station becomes a transmission station is determined by the set time of the timer (which has a value inherent to each station). In a control station, if the timer has not counted out yet, steps 102, 103 and 104 are not pursued, but only the step 105 continues to be persued. That is, a control program such as a program for controlling the operator 3A and the sensor 3B is executed.

The afore-mentioned interruption flow chart is shown in FIG. 8. In a step 106, when an interruption request enters, sequential discrimination to determine whether the interruption is caused by a clock signal, a GA signal or another signal is carried out. If the interruption is caused by a clock signal, the timer starts to decrement in a step 107. When a GA signal is received, the timer stops decrementing in a step 108 and returns to its initial state (set). Thus, a control station that is receiving a GA signal can never be a transmission station, since the timer never completes its count. If the timer has enough time to count until a GA signal arrives, the control station can acquire the transmission right.

In a step 109, other control programs are executed. If the timer has not counted out yet after these tasks (control programs) are finished, the tasks are continued.

Although, in the above embodiments, explanation has been made of a case where the value of the GA signal monitor timer depends on the logic number k of each station, the effect of this invention will not be damaged at all, even if the same value is set in the GA signal monitor timers of all the stations. Further, the delay circuit may be replaced by an 8-bit shift register or a 16-bit shift register.

As described above, according to this invention, communication with high reliability and a high speed response can be attained with a loop communication path without using any master station.

We claim:

1. A symmetric type loop communication system comprising a loop communication path, and a plurality of communication controlling stations connected in series by said loop communication path, each communication controlling station having means including a delay circuit connected to receive signals from said loop communication path and apply said signals to said communication path for performing a serial delay on said loop communication path of a bit serial transmission signal carried on said communication path from one station to another, an auxiliary input forming circuit for generating a transmission-right signal to be applied as a bit serial transmission signal on said loop communication path, and control circuit means connected to receive signals from said loop communication path for controlling the operation of said auxiliary input forming circuit to selectively apply said transmission-right signal from said auxiliary input forming circuit to said loop communication path in the absence of receipt of a transmission-right signal from said loop communication path.

2. A symmetric type loop communication system according to claim 1, in which said control circuit means in each of said plural communication controlling stations includes timer means for producing an output at the expiration of a set time which is different from the set time of each other control station; means connected to receive signals from said loop communication path for resetting said timer means of a station when a transmission-right signal from another control station is received from said loop communication path; and means for enabling said auxiliary input forming circuit to apply to said loop communication path said transmission-right signal together with message data in response to the output of said timer means.

3. A symmetric type loop communication system according to claim 2, further including selector means in each communication controlling station for selectively connecting either the output of said delay circuit or the output of said auxiliary input forming circuit to said control circuit means in response to a selection signal from said control circuit means.

4. A symmetric type loop communication system according to claim 3, further including a bypass circuit connected to said loop communication path in each communication controlling station for applying signals from said loop communication path directly to said selector means, said selector means being responsive to said selection signal for applying to said control means one of the outputs of said auxiliary input forming circuit, said delay circuit and said bypass circuit.

5. A symmetric type loop communication system according to claim 4, wherein said control circuit means further includes means responsive to the output of said timer means for generating a selection signal to control said selector to connect the outputs of said auxiliary input forming circuit and said delay circuit to said control circuit means, means for applying said transmission-right signal and message data to said loop communication path, and means for resetting said timer means and controlling said selector means to connect said bypass circuit to said control circuit means when a transmission-right signal is received in said control circuit means.

6. A symmetric type loop communication system according to claim 1, in which said delay circuit is a shift register having at least 4-bits delay.

7. A symmetric type loop communication system having a plurality of communication controlling stations connected to a loop communication path in series, each of said communication controlling stations comprising a delay circuit coupled to an input side terminal of each of said communication controlling stations for providing a delay time of the transmission of a received transmission-right signal depending on the bit length of said transmission-right signal to be circulated through said communication path, an auxiliary input forming circuit for generating a transmission-right signal, and a circuit means for outputting said transmissin-right signal from said delay circuit into an output side terminal of each of said communication controlling stations when said transmission-right signal is received from said communication path within a predetermined time interval and outputting said transmission-right signal from said auxiliary input forming circuit together with message data in each of said communication controlling stations into said output side terminal thereof when said transmission-right signal is not received from said communication path within said predetermined time interval.

8. A symmetric type loop communication system according to claim 7, in which each of said plural communication controlling stations further includes timer means which is reset when a transmission-right signal is received from said loop communication path for counting said preset time interval.

9. A symmetric type loop communication system according to claim 7, in which said delay circuit is a shift register having more than 4 bits.

10. A symmetric type loop communication system according to claim 7, each of said stations further comprising means for selectively bypassing said delay circuit.

11. A symmetric type loop communication system according to claim 10, in which each of said plural communication controlling stations has timer means with a set time different from each set time of the other control stations.

12. A symmetric type loop communication system according to claim 10, in which said delay circuit is a shift register having more than 4 bits.

* * * * *